J. STELMACH.
VEHICLE WHEEL LOCK.
APPLICATION FILED MAY 9, 1918.
1,319,631.
Patented Oct. 21, 1919.
2 SHEETS—SHEET 2.
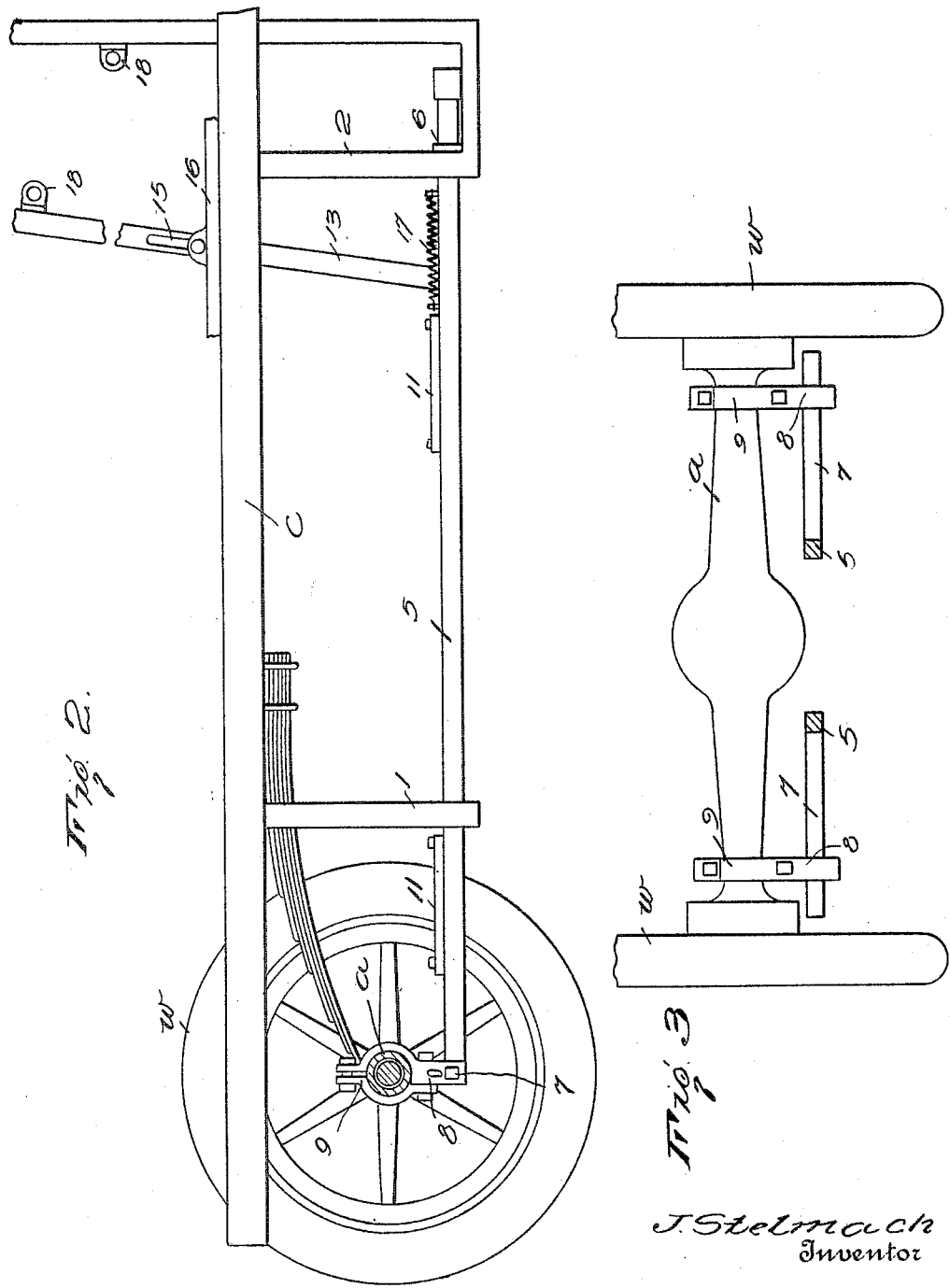
J. Stelmach
Inventor
By Geo. P. Kimmel
Attorney

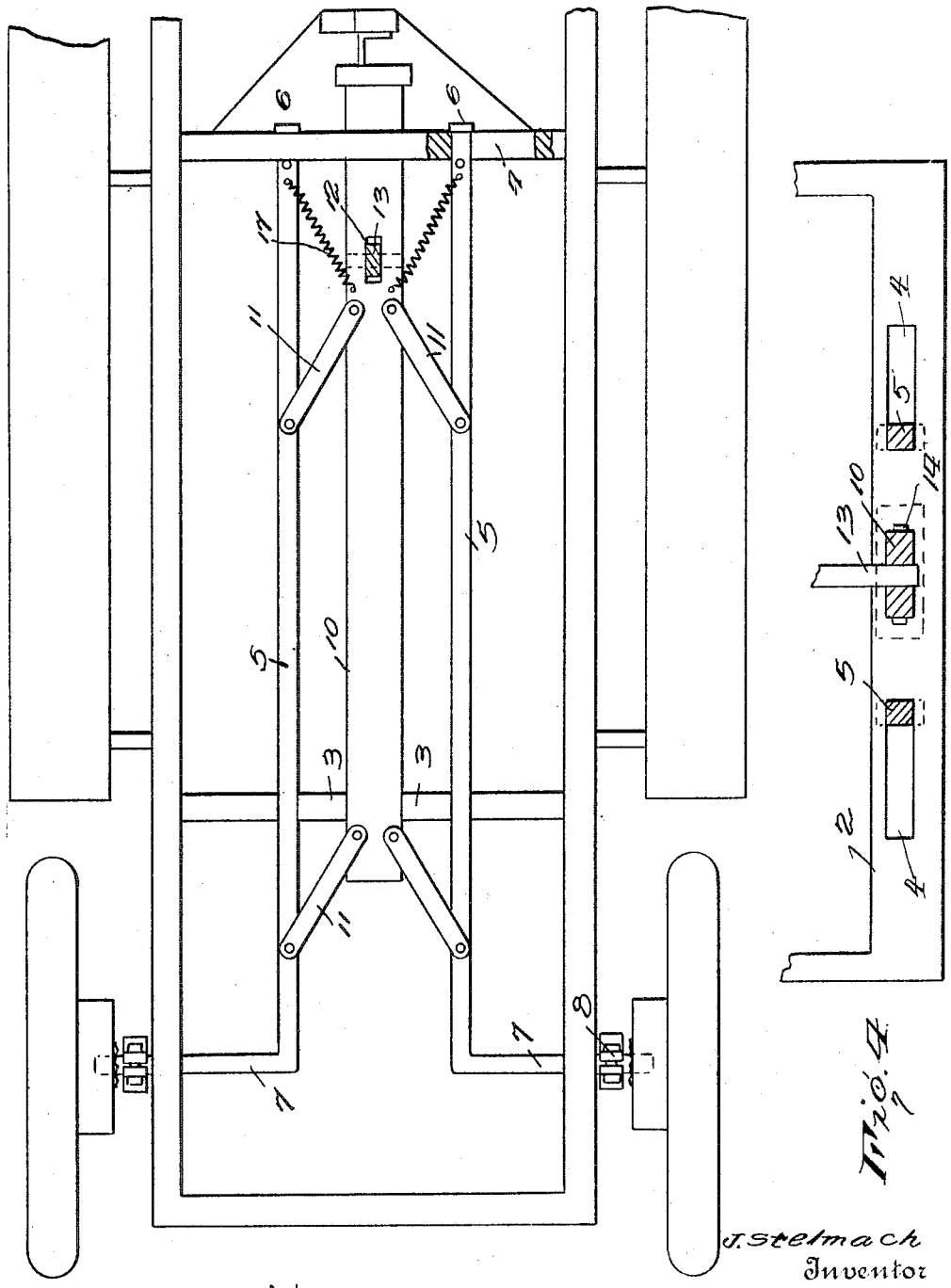

UNITED STATES PATENT OFFICE.

JOSEPH STELMACH, OF GARY, INDIANA.

VEHICLE-WHEEL LOCK.

1,319,631.  Specification of Letters Patent.  Patented Oct. 21, 1919.

Application filed May 9, 1918. Serial No. 233,511.

*To all whom it may concern:*

Be it known that I, JOSEPH STELMACH, a citizen of Galicia, residing at Gary, in the county of Lake and State of Indiana, have invented certain new and useful Improvements in Vehicle-Wheel Locks, of which the following is a specification.

This invention relates to improvements in vehicles and has for its principal object to provide a safety lock particularly adapted for use in connection with automobiles whereby the driving wheels thereof will be prevented from rotating and in consequence prevent the theft of a motor vehicle equipped therewith.

It is also an object of the invention to provide a lock of the character mentioned which can be attached to an automobile without alteration thereto.

The improvements in the details and arrangements of parts will be apparent from an inspection of the accompanying drawings, in connection with the specific description hereinafter contained, and wherein the preferred embodiment of the invention is disclosed for the purpose of imparting a full understanding thereof.

In the drawings:

Figure 1 is a fragmentary top plan of the chassis of a vehicle showing the improved lock applied thereto.

Fig. 2 is a longitudinal section through the same.

Fig. 3 is a vertical transverse section therethrough, and

Fig. 4 is a similar view showing the connection of the operating lever with the slidable bar.

Having more particular reference to the drawings, in connection with which like reference characters will designate corresponding parts throughout the several views, *c* represents the chassis of an automobile having my improved lock applied thereto, *a* the axle casing thereof, and *w* the driving wheels, it, of course, being understood that these driving wheels are mounted on the axle which extends through the casing *a*. Brackets 1 and 2 are secured to the chassis and depend therefrom, the bracket 1 being provided with spaced slots 3 while the bracket 2 is provided with oppositely disposed slots 4.

Slidably mounted on the brackets 1 and 2 are longitudinally disposed bars 5, which as will be noted have the headed ends 6 thereof passed through the slots 4 in the bracket 2, while the opposite portions thereof are slidably engaged on the bracket 1. Right angularly disposed bolts 7 are carried on the rear ends of the slidable bars 5 and have portions thereof passing through bracket arms 8 clamped to the opposite ends of the axle casing as at 9. In this connection it is to be noted that the ends of the bolts 7 are adapted to pass between the spokes of the driving wheels *w* at points in proximity to their respective hubs.

An operating bar 10 is mounted on the brackets 1 and 2 and is adapted to be moved longitudinally of the frame or chassis *c* of the vehicle, said bar having links, generally indicated by the numeral 11, pivoted thereto and extended into engagement with portions of the slidable bar 5 at points in proximity to the opposite ends thereof. A slot 12 is formed in the forward portion of the operating bar 10 and receives the lower end of an operating lever 13 therein, said lever being pivoted to the same by means of a pin 14 passing therethrough. The intermediate portion of the operating lever 13 is slotted as at 15 and engaged with a suitable bearing bracket 16 mounted on the vehicle chassis, while the upper or handle portion thereof extends to a point convenient to the operator's seat in order that the same can be readily operated therefrom. To normally retain the right angularly disposed bolts 7 in retracted positions with relation to the spokes of the driving wheels contractile coil springs 17 are engaged with the operating bar and with portions of the slidable bars 5.

In operation, to lock the driving wheels of a vehicle provided with my improved lock, the operating lever 13 is rocked to impart sliding movement to the operating bar 10 which by reason of its connecton with the bars 5 through the medium of the links 11 will impart lateral motion to said bars and consequently cause the right angularly disposed bolts 7 carried thereby to be moved outwardly between the spokes of the wheels, thus locking the same against rotation. To prevent shifting of the operating lever 13, hasps 18 are secured to the same and to a fixed portion on the vehicle and when alined serve to receive a suitable form of padlock therethrough. Obviously, should the openings between the spokes be disalined with the bolts, the wheels may be rotated slightly to cause the desired alinement.

Manifestly the construction shown is capable of considerable modification and such modification as is within the scope of my claims, I consider within the spirit of my invention.

I claim:

1. A wheel lock for vehicles including transversely slidable bars supported by the vehicle frame, right angularly disposed bolts carried by said bars and engageable between the wheel spokes, an operating bar arranged between and slidable longitudinally of said first bars, links pivotally engaged with said transversely slidable and operating bars, and means connected to said operating bar capable of being operated from the driver's seat in the vehicle for imparting sliding motion to the longitudinal bar and in consequence causing a shifting of the transversely slidable bars so as to arrange the bolts in locking relation with the wheel spokes.

2. A wheel lock for vehicles including brackets suspended from the vehicle frame one of which is formed with spaced slots, longitudinally disposed and transversely slidable bars having their forward ends mounted in the slots in one of the brackets and their rear portions resting on the other bracket, opposed depending bracket arms having openings in their lower ends, angular projecting spoke engaging bolts at the rear ends of the bars and slidably arranged through the openings in the bracket arms, an operating bar slidable longitudinally on the brackets and positioned between the other bars, links having their respective ends pivoted to the transversely slidable and the operating bars, a pivoted operating lever operably connected with the operating bar, means for releasably holding the bar when the parts are in locked position, and resilient means between the transversely slidable and operating bars for normally holding the bolts in an inactive position and for automatically returning the bolts to such position when the operating lever is released.

In testimony whereof, I affix my signature hereto.

JOSEPH STELMACH.

Copies of this patent may be obtained for five cents each, by addressing the "Commissioner of Patents, Washington, D. C."